United States Patent
Smith et al.

(10) Patent No.: US 11,880,289 B2
(45) Date of Patent: Jan. 23, 2024

(54) AUTO-DETECTION OF INTERCONNECT HANGS IN INTEGRATED CIRCUITS

(71) Applicant: Amazon Technologies, Inc., Seattle, WA (US)

(72) Inventors: Noga Smith, Cupertino, CA (US); Ron Diamant, Albany, CA (US); Saar Gross, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/896,739

(22) Filed: Aug. 26, 2022

(65) Prior Publication Data

US 2022/0413980 A1    Dec. 29, 2022

Related U.S. Application Data

(62) Division of application No. 16/456,902, filed on Jun. 28, 2019, now Pat. No. 11,429,503.

(51) Int. Cl.
  *G06F 11/30*    (2006.01)
  *G06F 11/14*    (2006.01)
  *G06F 13/28*    (2006.01)

(52) U.S. Cl.
  CPC ...... *G06F 11/3027* (2013.01); *G06F 11/1441* (2013.01); *G06F 13/28* (2013.01)

(58) Field of Classification Search
  CPC .................. G06F 11/3027; G06F 11/1441
  See application file for complete search history.

(56) References Cited

U.S. PATENT DOCUMENTS

| | | | | |
|---|---|---|---|---|
| 7,069,476 B1 * | 6/2006 | Insley | ................ | G06F 13/4291 710/110 |
| 7,478,286 B2 * | 1/2009 | Humphrey | .......... | G06F 13/4291 714/43 |
| 7,761,728 B2 * | 7/2010 | Cagno | ...................... | G06F 1/24 713/400 |

* cited by examiner

*Primary Examiner* — David E Martinez
(74) *Attorney, Agent, or Firm* — Klarquist Sparkman, LLP

(57) ABSTRACT

A self-detection mechanism for an IC is disclosed that determines whether the IC's internal bus is in a hanging state. An initialization sequence can be modified after a soft reset by reading data from an internal DRAM of the IC using a Direct Memory Access (DMA) controller as part of the initialization sequence. The read command is issued over the internal bus and, if the bus is hanging, the read command is not completed. Monitoring can be performed by waiting a predetermined period of time (e.g., 100 ms) to determine if the read was properly completed. If so, no further action is needed. If the read was not completed, then a hard reset is requested to be performed. Thus, an initialization sequence can be modified to run dummy transactions through the internal bus, and validate that all paths are functional.

20 Claims, 6 Drawing Sheets

AUTO-DETECTION OF INTERCONNECT HANGS IN INTEGRATED CIRCUITS

CROSS-REFERENCE TO RELATED APPLICATION

This application is a divisional of U.S. patent application Ser. No. 16/456,902, filed Jun. 28, 2019, which application is incorporated herein by reference in its entirety.

BACKGROUND

Integrated Circuits (ICs) contain internal buses that follow standard protocols for communication between internal logic blocks. Some examples include an Advanced Extensible Interface (AXI) bus protocol, an Advanced High-performance Bus (AHB) protocol, an Open Core Protocol (OCP), etc.

In some cases, an internal bus within an IC can hang (i.e., be non-responsive). In one example, the AXI bus requires each transaction to complete before performing a next transaction. If a clock becomes unstable or is lost for a period of time, the AXI bus can become unstable and hangs because it cannot complete the current transaction. In such a case, a hard reset is required. However, detection of problems on internal buses within an IC has been problematic.

DETAILED DESCRIPTION

An internal bus (e.g., AXI, AHB, OCP) within an IC can hang in certain scenarios, such as when the IC loses a reference clock. Loss of the reference clock can occur, for example, when the IC is positioned on a daughter card that is unplugged from a motherboard in a server computer. Loss of the reference clock, or even a reference clock that becomes unstable for a transient period of time, can cause the IC's internal bus to enter into a hanging state, such as an illegal state, or a state wherein functionality is not guaranteed. A hardware reset (i.e., cycle power) can correct the hanging state, but is undesirable unless necessary. A processor on the motherboard can issue a soft reset, but the processor does not have knowledge whether a soft reset corrected the problem, which can result in multiple soft resets that waste time and resources. As a result, it is beneficial to detect that the IC internal bus is in a hanging state and request a hard reset from the processor. Thus, the processor can be alerted by the IC to bypass any further soft resets in favor of issuing a hard reset.

The solution is a self-detection mechanism associated with the IC that determines that the IC internal bus is in a hanging state. An initialization sequence can be modified to run a dummy transaction through the internal bus and validate that all paths are functional (before indicating successful initialization). In one example, an initialization sequence can be modified after a soft reset (e.g., a PCIe reset) by reading data from an internal DRAM of the IC using a Direct Memory Access (DMA) controller as part of the initialization sequence. The read command is issued over the internal bus and, if the bus is hanging, the read command is not completed. Monitoring can be performed by waiting a predetermined period of time (e.g., 100 ms) to determine if the read was properly completed. If so, no further action is needed. If the read was not completed, then a hard reset is requested to be performed, such as by a processor external to the IC. In short, an IC internal bus health check is performed.

Figure 1:
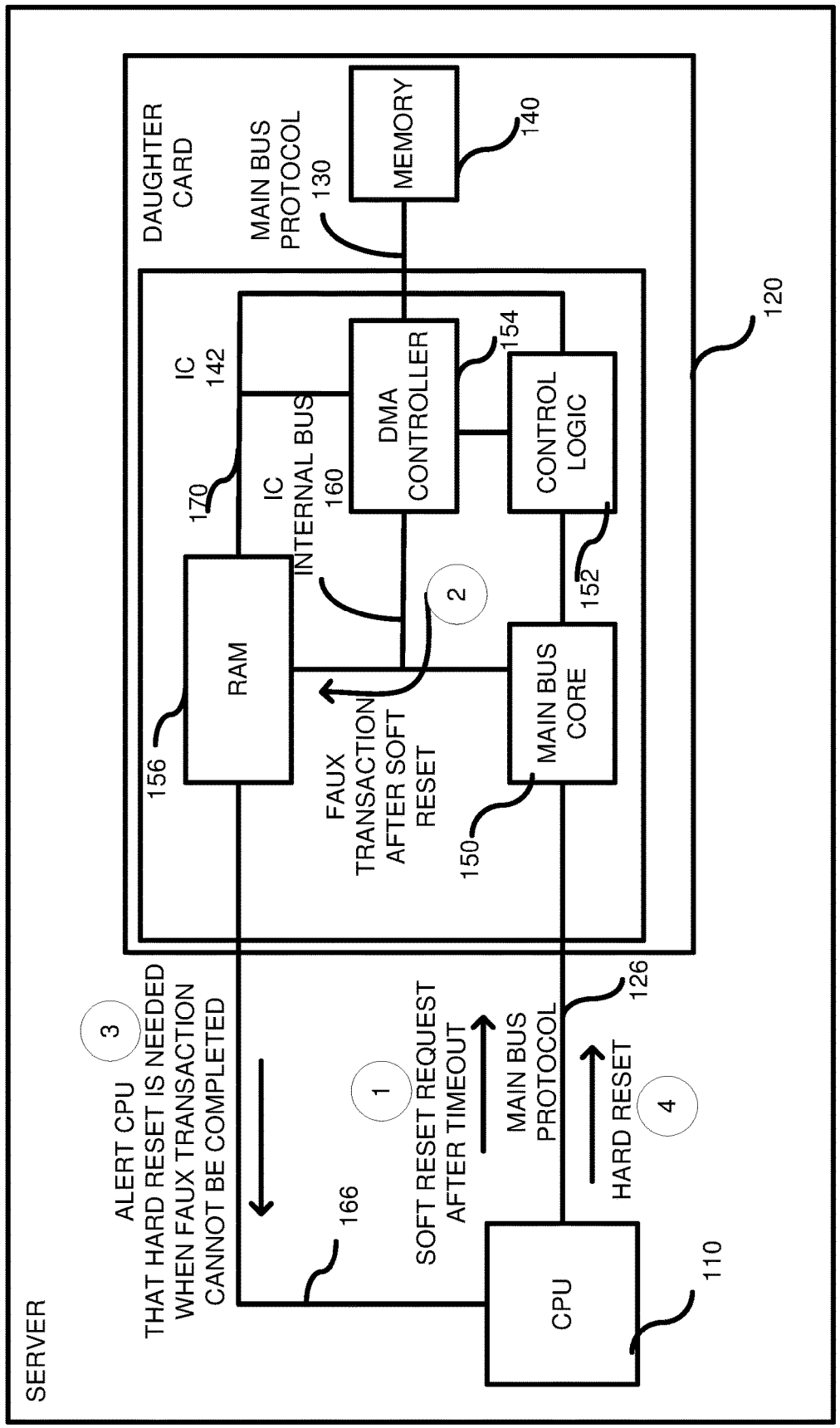
FIG. 1 shows a server computer, according to one embodiment, including a daughter card having an IC positioned thereon, with a detection procedure shown to determine whether an internal bus in the IC is hung.

FIG. 1 is a server computer 100 according to one embodiment. The server computer 100 can include a CPU 110, which can be a general-purpose central processing unit (CPU), a processor in an application-specific integrated circuit (ASIC) or any other type of processor. Generally, the processor 110 is the main processor of the server computer 100 and can reside on the motherboard. The processor can be a chipset, although it is shown generically as a single CPU. A daughter card 120 can be plugged into slots within the server computer so as to connect to a main bus 126. The main bus 126 can be any of a variety of standards, such as PCIe, SATA, SAS, etc. The daughter card 120 can also include portions that use a protocol associated with the main bus 126, such as is shown at 130, which couples a memory 140 to an IC 142. The IC 142 can include a variety of hardware and firmware components, such as a main bus core 150, control logic 152, a DMA controller 154, and a RAM 156. One or more of these components can be coupled together using an IC internal bus 160, which can be a variety of different types of internal buses including, but not limited to, AXI, AHB, OCP, etc. Additionally, the RAM 156 can be coupled to the CPU 110 through a separate bus 166.

In some instances, the internal bus 160 can get into a state where it is nonresponsive. The CPU 110 can request a read operation from the memory 140. Due to the hanging state of the internal bus 160, the CPU 110 does not receive a response to its request and times out. As a result, the CPU 110 takes corrective action. A sequence of events then occurs as indicated by the numbered circles. Starting at number 1, the CPU 110 issues a soft reset request using the main bus 126. However, due to the hanging of the internal bus 160, the soft reset is ineffective. Nonetheless, the CPU 110 is unaware that the internal bus 160 is still hung. In order to self check after the soft reset, the DMA controller 154 can issue a faux transaction shown at number 2. The faux transaction is a transaction that occurs on the internal bus 160 and can be any of a variety of transactions, such as a read of the RAM 156. A timer (not shown) can track whether the faux transaction was completed. If not, then the CPU 110 can be alerted via a transmission from the IC 142 to the CPU 110 as shown at number 3. In this example, the alert is issued through the separate bus 166 using a memory location in the RAM 156. Other techniques can be used for alerting the CPU 110, such as using the main bus 126 or receiving the alert from a different location than the RAM 156. This alert to the CPU 110 instructs the CPU to forego any further soft resets until a hard reset is performed. Consequently, as shown at number 4, the CPU issues a hard reset to the daughter card 120, which cycles power so as to reset the hardware and firmware on the IC 142.

The control logic 152 can detect that the soft reset was requested at number 1 and can instruct the DMA controller 154 to issue the faux transaction shown at number 2. Additionally, the control logic 152 can include logic for determining whether the faux transaction was completed. If the faux transaction was not completed, the control logic 152 can also set the flag in the RAM 156 or within a separate register so as to alert the CPU 110. Setting the flag can occur through a separate bus 170 that is independent of the hanging bus 160. The control logic 152 can be integrated within the IC 142, as shown, or can be positioned outside of the integrated circuit 142, such as in the CPU 110 or elsewhere on the daughter card 120.

Figure 2:
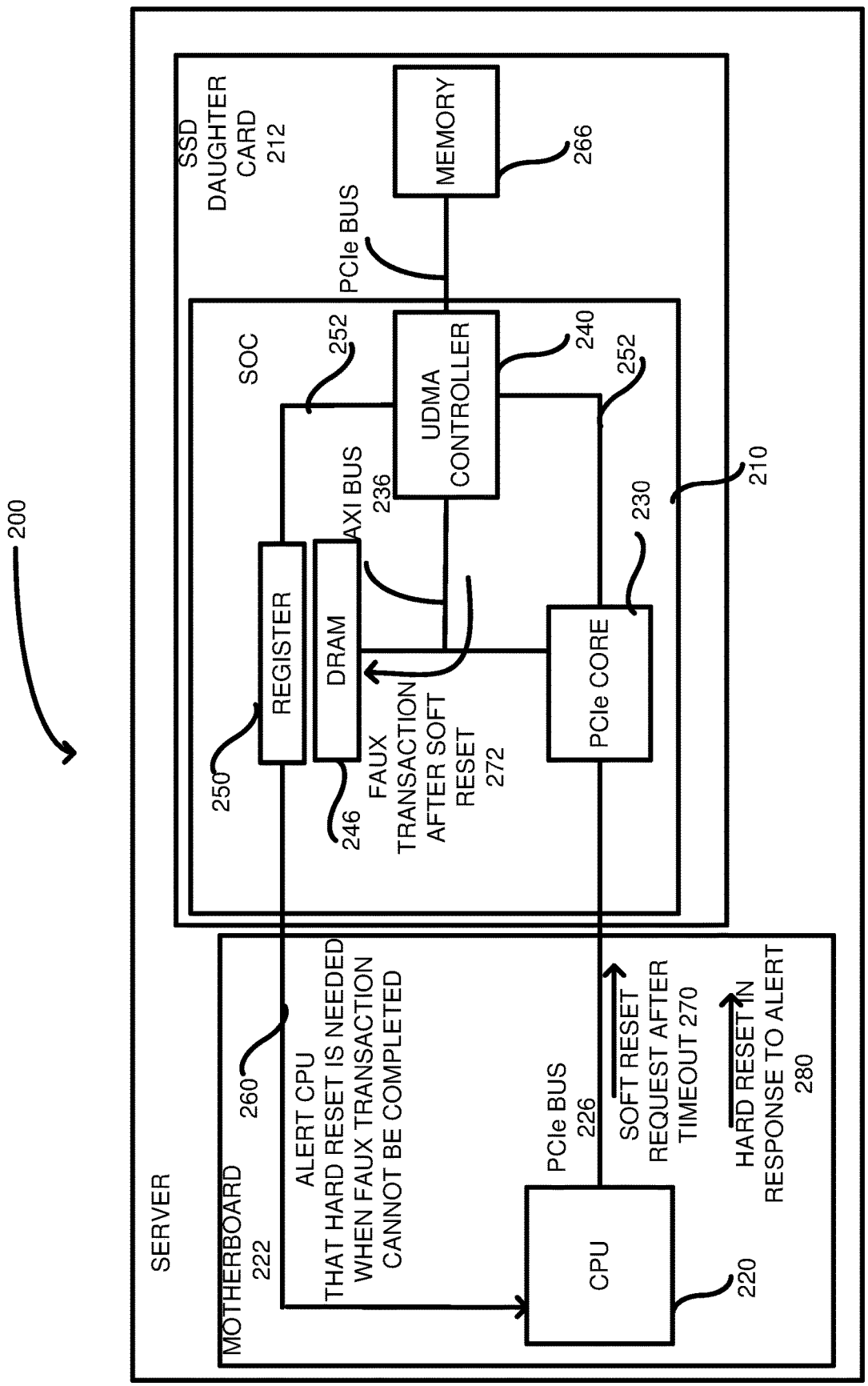
FIG. 2 shows a server computer according to another embodiment wherein the internal bus is an AXI bus and the daughter card is a Solid State Drive (SSD).

FIG. 2 shows another embodiment of a server computer 200 with an IC 210 (shown as a System on Chip (SOC)) positioned on a daughter card 212, which is a solid-state drive (SSD). A CPU 220 is positioned on a motherboard 222 within the server computer 200. The CPU 220 is coupled to the IC 210 through a PCIe bus 226. The IC 210 includes a PCIe core 230, which converts transactions from an internal AXI bus 236 to transactions conforming to the PCIe protocol and vice versa. The IC 210 further includes a UDMA controller 240 coupled through the AXI bus 236 to a DRAM 246. The IC 210 can further include a register 250 coupled to the UDMA controller 240 through an independent bus 252 and further coupled to the CPU 220 through yet another independent communication channel 260.

Assuming the AXI bus 236 becomes hung at some point in time, the CPU 220 makes a request to access a memory 266 on the SSD 212. Although the memory 266 is shown external to the SOC 210, it can be positioned internally to the SOC. Because the AXI bus 236 is not functioning, the CPU 220 does not receive a response to its request. After a time out (e.g., a predetermined period of time), the CPU 220 issues a soft reset, as indicated at 270. The PCIe core 230 can translate the request 270 and transmit the request over the bus 252 to the UDMA controller 240. The UDMA controller 240 can perform the soft reset in a known manner. After the soft reset is attempted, the UDMA controller can transmit a faux transaction 272 to the DRAM 246. The faux transaction can be a read request from the DRAM. The UDMA controller 240 can detect that no response was received due to the AXI bus 236 being hung so that the faux transaction did not complete and can set an alert flag in register 250 (which is a memory element) via bus 252. The CPU 220 can read the register 250 and detect the alert flag is set indicating that a hard reset is needed. The CPU 220 can then issue a hard reset over the PCIe bus, as shown at 280. The hard reset can take a variety of forms, such as cycling power for the system, a sub-system (e.g., just the daughter card 212), or just the IC 210.

Figure 3:
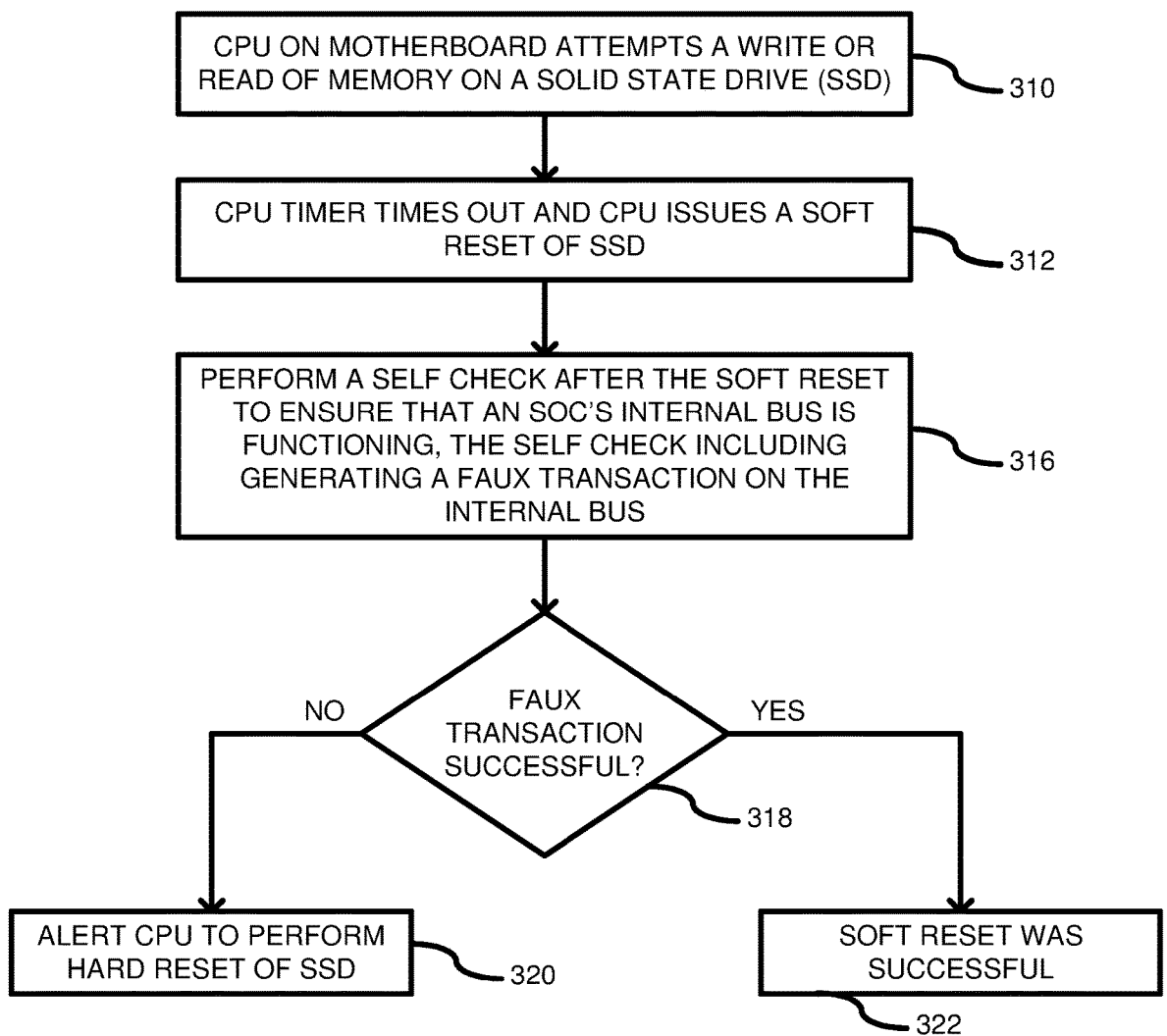
FIG. 3 is a flowchart of a method, according to one embodiment, for checking and correcting the internal bus of FIG. 2.

FIG. 3 is a flowchart according to one embodiment for detecting interconnect hangs within an IC. In process block 310, a CPU on a motherboard attempts a write or read of memory on a SSD. For example, in FIG. 2, the CPU 220 can request a read of the memory 266 that is within the SSD 212. The write or read request is transmitted via the PCIe bus 226 to the SOC 210. In this example, the AXI bus 236 is currently hung when the write or read is received. In process block 312, a CPU timer (internal to the CPU) times out and the CPU issues a soft reset of the SSD. For example, in FIG. 2, the CPU 220 issues a soft reset 270 to the SSD 212. The soft reset does not cycle power, like a hard reset. Instead, the soft reset can restart software running on the SSD and clear any data, such as from the DRAM 246 within the SOC 210. In process block 316, a self check can be performed after the soft reset to ensure that the SOC's internal bus is functioning. The self check can include generating a faux or dummy transaction on the internal bus of the SOC. For example, in FIG. 2 a faux transaction 272 can be generated by the UDMA 240 on the AXI bus 236. The faux transaction 272 can be a simple read of the DRAM 246, but other faux transactions can be performed so long as the transaction can be verified to have been completed. The UDMA controller 240 can be instructed to generate the faux transaction by firmware external to the SOC, such as by the CPU 220 over bus 252, or by logic internal to the SSD, such as the UDMA controller 240 or the control logic 152 (FIG. 1) (which can be included in FIG. 2 in certain embodiments). In decision block 318, a determination is made whether or not the faux transaction was successful. For example, if the read of memory 246 is successful, then the UDMA controller 240 receives a response to the read request, which results in a detection that the faux transaction was completed. The response can be consumed by the UDMA controller or passed to other control logic so as to verify or otherwise detect that the faux transaction was completed, which indicates that the AXI bus is functioning. If the faux transaction was successful, then the soft reset was successful, as indicated at process block 322. In such a case, no further action is required. Otherwise, if the faux transaction was not successful, then in process block 320, the CPU is alerted to perform a hard reset of the SSD. For example, such an alert can be made by the UDMA controller 240 by setting a flag in a register 250 using the bus 252. The CPU 220 can then poll the register 250 using bus 260 and, based on the flag, determine that a hard reset 280 is required.

Figure 4:
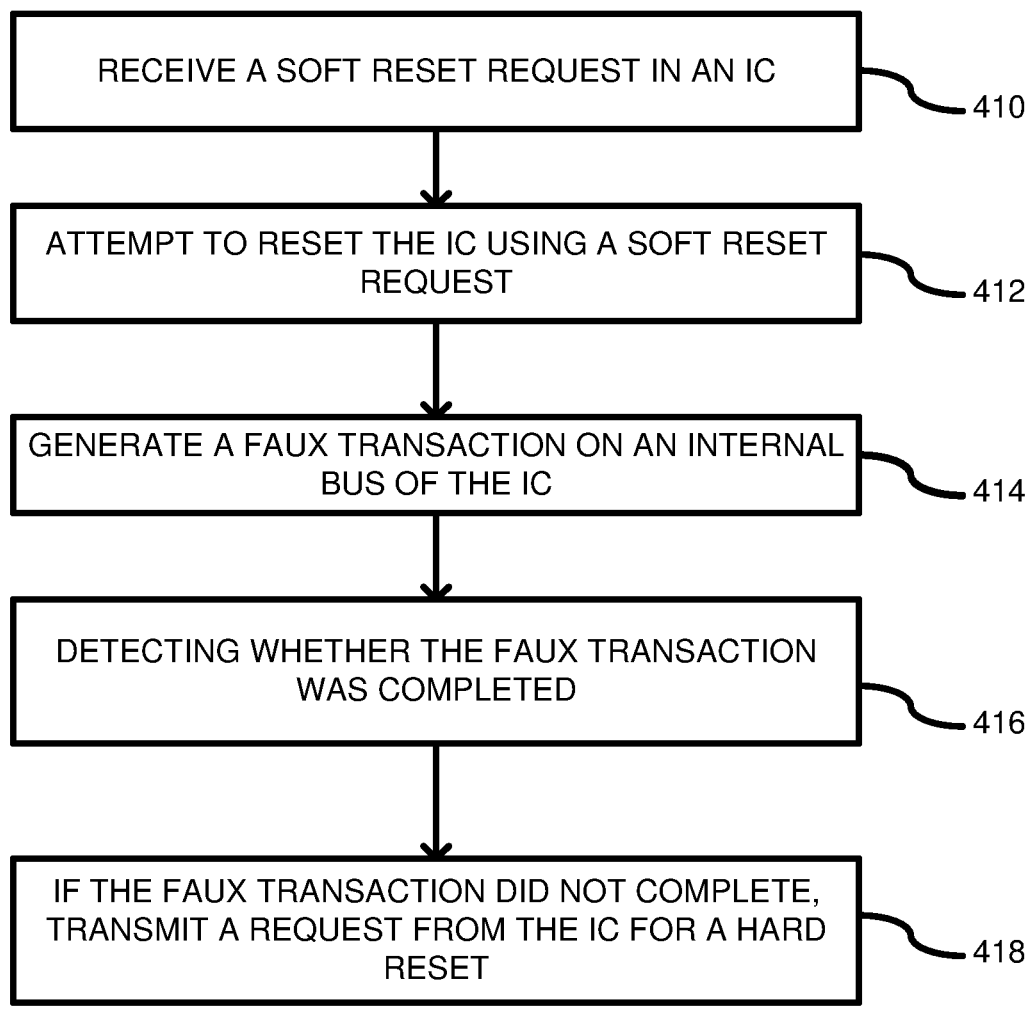
FIG. 4 is a flowchart according to another embodiment for correcting an internal bus.

FIG. 4 is a flowchart according to another embodiment for detecting interconnect hangs within an IC. In process block 410, a soft reset request is received in the IC. Generally, the soft reset request is received in the IC by an external source. For example, in FIG. 1, a soft reset request (shown at circled 1) is generated by the CPU 110 after the CPU 110 detects an error condition due to a timeout. In process block 412, the IC resets in response to the soft reset request. Such a soft reset can depend on the particular implementation, but the control logic 152 can act to reinitialize any software or firmware executing on the IC 142. Other functionality can also be initialized, such as clearing registers or clearing RAM 156 internal to the IC. While the control logic 152 executes to perform the soft reset, it is possible that the internal bus 160 remains hung or locked, which can result in some of the other hardware components (e.g., RAM, DMA controller, etc.) not being reset. In process block 414, a faux transaction is generated on the internal bus of the IC. For example, in FIG. 1, the DMA controller generates a faux transaction on the internal bus 160, as seen at number 2. The faux transaction can be an operation performed on the RAM (e.g., read or write). In process block 416, a detection is made whether the faux transaction was completed. For example, the DMA controller can receive a response to the faux transaction to complete the faux transaction. If the faux transaction is completed, then the soft reset worked and normal operation can be resumed. If the faux transaction does not complete, then that is an indication that a hard reset is needed. In such a case, a control bit or flag can be set to indicate to the CPU that a hard reset should be performed. For example, in FIG. 1, the hard reset can be a memory location in RAM 156 that is readable by the CPU through a separate bus 166. In response to receiving the request for the hard reset, the CPU 110 can forego any pending soft resets and initiate a hard reset, as shown at number 4. Although the request for a hard reset has been shown over a separate bus, such as bus 166, it can be requested over the main bus, such as the PCIe bus 226 (FIG. 2).

Figure 5:
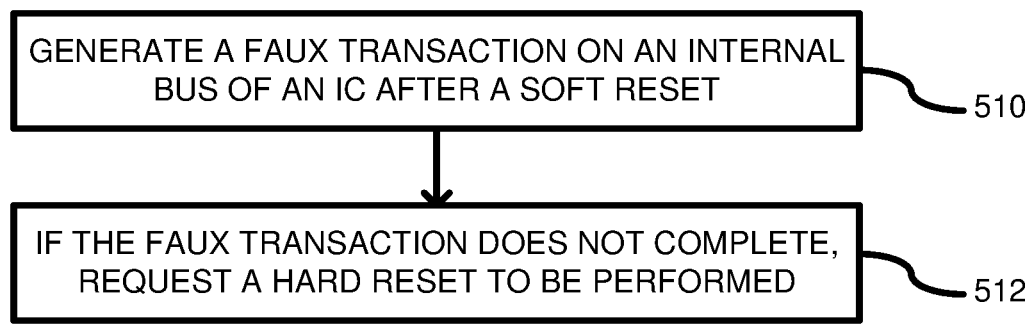
FIG. 5 is a flowchart according to another embodiment for correcting an internal bus.

FIG. 5 is a flowchart of a method according to another embodiment. In process block 510, a faux transaction is generated on an internal bus of an IC after a soft reset. The faux transaction is considered a dummy transaction in that it has the purpose of testing a bus transaction to determine whether the bus is hung. In FIG. 1, the faux transaction is shown at number 2, while in FIG. 2, it is shown at 272. Generation of the faux transaction can occur in a number of ways, such as using software, hardware or firmware on either the IC, the CPU, or a combination of both. In process block 512, if the faux transaction does not complete, then a request can be made for a hard reset to be performed. For example, the control logic 152 of FIG. 1 can timeout waiting for a result of a read operation to be completed by the DMA controller 154. If the timeout occurs, then the control logic 152 can set a bit in RAM 156 or a register 250. Otherwise, the register 250 can be set by other hardware, such as the UDMA controller 240.

Figure 6:
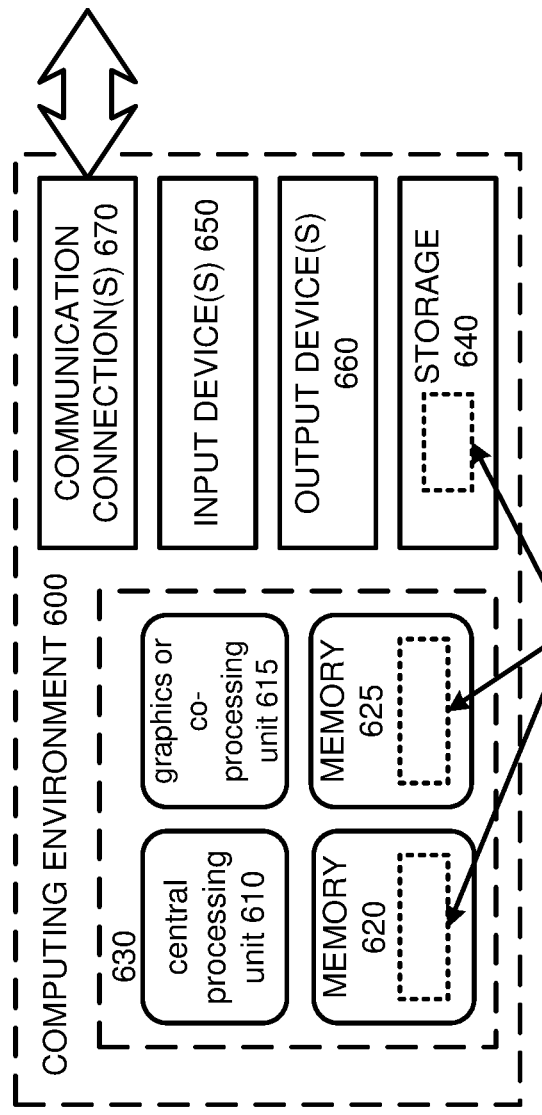
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). The IC described in FIGS. 1 and 2 can be positioned within storage 640.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. An Integrated Circuit (IC), comprising:
   a Direct Memory Access (DMA) controller;
   a memory coupled to the DMA through a bus internal to the IC; and
   a memory element within the memory or external to the memory coupled to the DMA controller, the memory element for indicating whether a hard reset of the IC is needed, wherein the IC is configured to set the memory element after a faux transaction on the bus fails to complete subsequent to a soft reset of the IC.

2. The IC of claim 1, wherein the IC is coupled to a processor, which is configured for reading the memory element and generating the hard reset in response to the memory element being set.

3. The IC of claim 1, wherein the IC is positioned within a server computer and is part of a Solid State Drive (SSD).

4. The IC of claim 3, wherein the IC is further positioned on a daughter card plugged into the server computer.

5. The IC of claim 3, wherein the hard reset is configured to be initiated by a processor on a motherboard within the server computer.

6. The IC of claim 1, wherein the bus is an Advanced Extensible Interface (AXI) bus.

7. The IC of claim 1, wherein the IC further includes a Peripheral Component Interconnect Express (PCIe) core for coupling to a PCIe bus.

8. The IC of claim 7, wherein the soft reset resets the PCIe core without cycling power on the IC.

9. The IC of claim 1, wherein the faux transaction is a read of the memory using the DMA controller.

10. The IC of claim 1, wherein the hard reset cycles power so as to reset hardware and firmware on the IC.

11. An Integrated Circuit (IC), comprising:
    a Direct Memory Access (DMA) controller;
    a memory coupled to the DMA through a bus internal to the IC; and
    wherein the DMA controller is configured to transmit a faux transaction to the memory on the bus subsequent to a soft reset to test whether the bus is in a hung state.

12. The IC of claim 11, wherein the DMA controller is configured to set a memory element within the memory or external to the memory if the faux transaction fails.

13. The IC of claim 12, wherein the memory element is coupled to a processor within a server computer and the IC is configured to alert the processor that a hard reset is needed if the faux transaction fails through the setting of the memory element.

14. The IC of claim 11, wherein the faux transaction is configured to occur after the soft reset of the IC.

15. The IC of claim 11, wherein the soft reset is configured to restart software running on the IC without cycling power to the IC.

16. The IC of claim 11, wherein the IC further includes a Peripheral Component Interconnect Express (PCIe) core for coupling to a PCIe bus.

17. An Integrated Circuit (IC), comprising:
    a Direct Memory Access (DMA) controller;
    a memory coupled to the DMA through a bus internal to the IC; and
    a memory element coupled to the DMA controller, wherein the IC is configured to set the memory element after a faux transaction on the bus fails to complete subsequent to a soft reset of the IC for indicating that a hard reset of the IC is needed.

18. The IC of claim 17, wherein the memory element is within the memory or external to the memory.

19. The IC of claim 17, wherein the faux transaction includes a read of the memory from the DMA controller.

20. The IC of claim 17, wherein the internal bus is an Advanced Extensible Interface (AXI) bus and the IC is coupled to a processor via a Peripheral Component Interconnect Express (PCIe) bus.

* * * * *